Figures 1, 2:
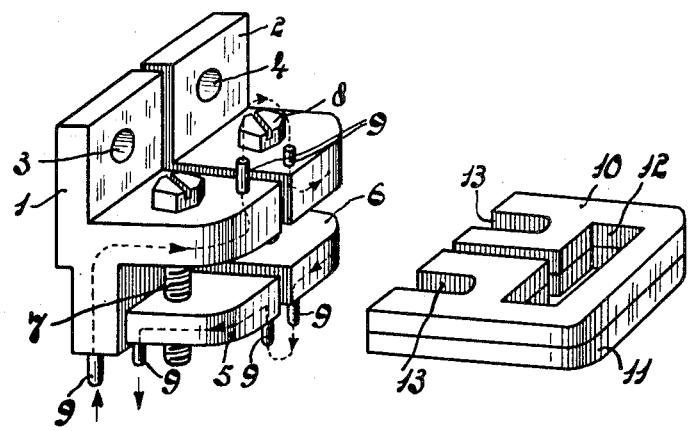

June 19, 1956

L. BLOK ET AL 2,751,481

CLAMPING DEVICE INTENDED FOR THE ELECTRICAL CONNECTION
OF A WORK-COIL FOR THE INDUCTIVE HEATING OF
WORK-PIECES TO THE SECONDARY WINDING OF
THE OUTPUT COIL OF A HIGH-FREQUENCY
Filed March 15, 1952

INVENTORS
Lourens Blok
Dirk Christiaan Van Iperen
By Fred M Vogel
Agent

United States Patent Office 2,751,481
Patented June 19, 1956

2,751,481

CLAMPING DEVICE INTENDED FOR THE ELECTRICAL CONNECTION OF A WORK-COIL FOR THE INDUCTIVE HEATING OF WORK-PIECES TO THE SECONDARY WINDING OF THE OUTPUT COIL OF A HIGH-FREQUENCY

Lourens Blok and Dirk Christiaan van Iperen, Eindhoven, Netherlands, assignors to Hartford National Bank and Trust Company, Hartford, Conn., as trustee Application March 15, 1952, Serial No. 276,835

Claims priority, application Netherlands April 20, 1951

3 Claims. (Cl. 219—10.79)

According to the invention, a clamping device adapted to electrically connect a work-coil for the inductive heating of workpieces to the secondary winding of the output coil of a high-frequency generator is characterised in that the clamping device comprises cooling channels for artificial cooling by means of a cooling agent. It is thus possible to utilize a work-coil which does not comprise a cooling channel, since the heat produced in such a work-coil may be sufficiently dissipated on account of the large contact surface with the clamping device. It is thus also possible to utilize a very simple work-coil which is punched, for example, from sheet material.

According to a further feature of the invention, the clamping device is adapted to clamp a work-coil which comprises two or more stacked members. This affords the advantage that, whilst the dimensions of the work-coil may be adapted in a very simple manner to the length of the work-piece to be treated, it is also possible to ensure satisfactory cooling of all the work-coil members by means of a single clamping device.

The invention will now be explained more fully by reference to the accompanying drawing, given by way of example, in which Figs. 1 and 2 show a clamping device and a work-coil comprising two stacked plate-like members respectively.

In Fig. 1, two poles 1 and 2 are connected by means of bolts passed through apertures 3 and 4 to the two extremities of the secondary winding of the output coil of a high-frequency generator. The terminals 1 and 2 comprise two bodies 1, 5 and 2, 6 respectively, of which the bodies or members 5 and 6 are adjustable with respect to 1 and 2 by means of bolts 7 and 8. All the bodies are internally provided with cooling channels or cavities which empty into tubes 9. The latter are interconnected with the use of rubber tubing, so that the cooling agent successively traverses all the bodies in accordance with the dotted line shown.

Fig. 2 shows a work-coil comprising two stacked plate-like members 10 and 11 of same shape, each comprising a working aperture 12 for embracing a workpiece and slots 13 to accommodate the bolts 7 and 8 of the clamping device. The contact surfaces are such that the heat produced in the coils may be sufficiently dissipated on the clamping device.

It is evident that more than two stacked members may be used. The thickness of each working member in one practical example was 5 mms.

What we claim is:

1. A clamping device for electrically connecting a work-coil for the inductive heating of work pieces to a secondary winding of an output coil of a high frequency generator comprising at least one pair of heat conducting members connected to said high frequency generator, said members having opposed clamping surfaces for holding at least one work-coil therebetween, means for adjustably spacing said members relative to one another, a work-coil clamped between said opposed surfaces, and a plurality of cooling channels in each of said members for artificially cooling said members and said work-coil by means of a circulating cooling agent in said channels.

2. A clamping device for electrically connecting a work-coil for the inductive heating of work pieces to a secondary winding of an output coil of a high frequency generator comprising at least two pairs of heat conducting members connected to said high frequency generator, each pair of members having opposed clamping surfaces for holding electrical connections of at least one work-coil therebetween, means for adjustably spacing the members of each pair relative to one another, a work-coil having electrical contacting regions clamped between said opposed surfaces, a plurality of interconnected cooling channels in each of said members for artificially cooling said members and said work-coil by means of a circulatory cooling agent in said channels.

3. A high frequency generator comprising an output coil with a secondary winding, a solid, metallic work-coil for the inductive heating of work-pieces, clamping means for electrically connecting said work-coil to said secondary winding, said clamping means including a pair of spaced members, said work-coil being adapted to be clamped between said members and comprising a plurality of flat, superposed elements provided with a working aperture, the contact areas for said electrical connection being so proportioned that the heat produced in said work-coil is sufficiently dissipated due to contact with said clamping means, and a plurality of cooling channels in each of said members for artificially cooling said members and said work-coils by means of a circulating cooling agent in said channels.

References Cited in the file of this patent

UNITED STATES PATENTS

| 1,449,369 | Anderson | Mar. 27, 1923 |
| 2,128,086 | Gakle | Aug. 23, 1938 |
| 2,181,644 | Seifert | Nov. 28, 1939 |
| 2,493,950 | Dow et al. | Jan. 10, 1950 |
| 2,665,367 | Seulen | Jan. 5, 1954 |

FOREIGN PATENTS

| 284,521 | Switzerland | July 31, 1952 |
| 613,322 | Great Britain | Nov. 25, 1948 |
| 613,323 | Great Britain | Nov. 25, 1948 |